No. 713,730. Patented Nov. 18, 1902.
C. A. WILLMARTH.
WIRE FENCE RATCHET OR TIGHTENER.
(Application filed May 16, 1902.)
(No Model.)
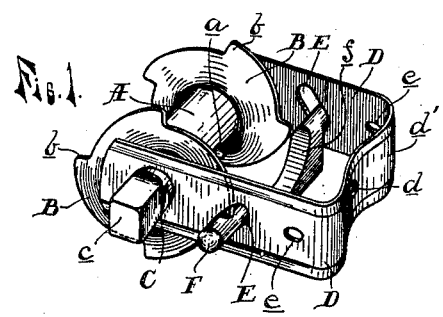
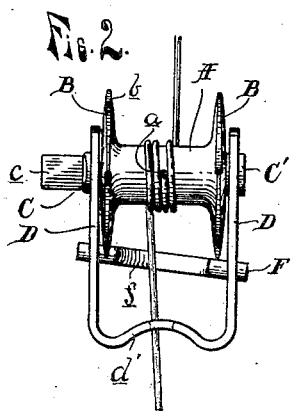
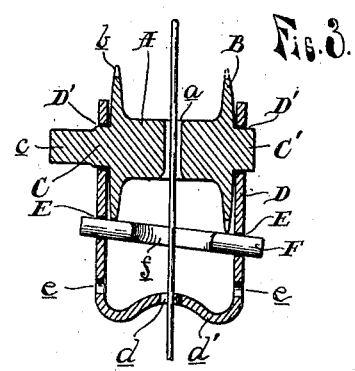
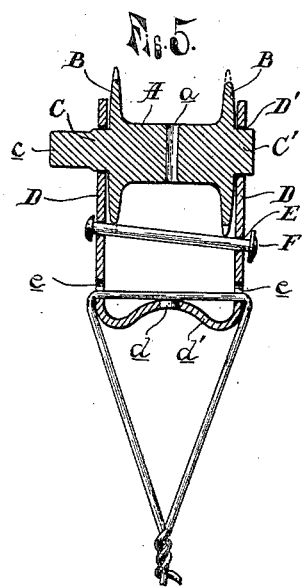
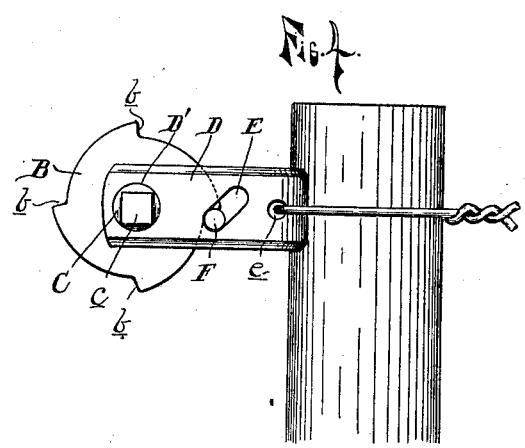
WITNESSES.
INVENTOR.
Charles A. Willmarth,
By
Attorneys.

UNITED STATES PATENT OFFICE.

CHARLES A. WILLMARTH, OF DETROIT, MICHIGAN, ASSIGNOR, BY MESNE ASSIGNMENTS, TO UNIVERSAL RATCHET CO., OF DETROIT, MICHIGAN.

WIRE-FENCE RATCHET OR TIGHTENER.

SPECIFICATION forming part of Letters Patent No. 713,730, dated November 18, 1902.

Application filed May 16, 1902. Serial No. 107,552. (No model.)

*To all whom it may concern:*

Be it known that I, CHARLES A. WILLMARTH, a citizen of the United States of America, residing at Detroit, in the county of Wayne and State of Michigan, have invented certain new and useful Improvements in a Wire-Fence Ratchet or Tightener, of which the following is a specification, reference being had therein to the accompanying drawings.

My invention relates to new and useful improvements in ratchets for tightening the line-wires of wire fences, and has for its object to make a ratchet or tightener which shall be reversible, cheap, simple, and not liable to get out of repair and in which there are no loose parts to become lost, a further object being to make a ratchet which may be strung right on the line-wire and may be tightened from either side of the fence or used as a post-ratchet without alteration.

To this end the invention consists, essentially, of a spool formed with trunnions and ratchet-teeth at its opposite ends, a yoke provided with openings in which said trunnions are journaled, and a transverse gravity-bar guided in oppositely-inclined slots in the opposite sides of the frame or yoke and coöperating with ratchet-teeth on the flanges of the spool to lock the spool from unwinding in any position; and it consists, further, in the peculiar formation of the yoke, whereby the ratchet-frame is strengthened and may be used either as a post or line-wire ratchet, and consists, further, in the peculiar construction of the weighted gravity-dog and in the arrangement and combination of parts, all as more fully hereinafter described, and shown in the accompanying drawings, in which—

Figure 1 is a perspective view of my improved ratchet; Fig. 2, a plan view of the same as in use upon the line-wires of a fence; Fig. 3, a horizontal section as strung upon a line-wire; Fig. 4, as in use as a post-ratchet, and Fig. 5 a modified construction.

A is the spool, provided with a transverse opening $a$ through its axis and end flanges B B, formed with oppositely-disposed ratchet-teeth $b$ upon their periphery and trunnions C C' at the opposite ends of the spool, the trunnion C being extended and formed with a squared end $c$ to form a wrench-hold to turn the spool in tightening the line-wires of a fence.

D is a yoke or frame formed with openings D' at its ends in which the trunnions C C' are journaled, the frame being preferably bent up cold from bar-iron right over the trunnions, so that there are no parts to get lost.

$d$ is an opening in the transverse portion $d'$ of the frame in line with the opening $a$ in the spool, so that the ratchet can be strung right upon a line-wire, thus not necessitating the cutting of the wire, and $e$ are openings formed at or near the bends of the frame, through which a wire may be passed to fasten the ratchet to a post, thus dispensing with the use of nails or screws to fasten the ratchet to the post or the boring of a hole through the posts, which all require special tools and labor.

The transverse connecting member $d'$ of the yoke or frame is bent inward to strengthen the frame, at the same time forming a seat for the post where the ratchet is used as a post-ratchet, and the inwardly-curved portion forms a bearing for the wire where two ends of a line-wire are to be connected by the ratchet, as shown in Fig. 5, thus preventing the cutting of the wire or the collapse of the frame under great strain.

E E are oppositely-inclined slots formed in the opposite sides of the yoke adjacent to the ratchet-teeth on the flanges of the spool, and F is a weighted bar or gravity-dog extending transversely of the frame with its opposite ends guided in said slots and coöperating with the ratchet-teeth to lock the spool and prevent the same from unwinding when in use, one end of the dog and ratchet-teeth acting in one position of the parts and the opposite end in the other position, so that no matter which way it may be turned by the twisting of the wire it will always be locked. The ends of the locking-bar project slightly beyond the frame to form a suitable handhold in releasing the ratchet, and the dog is preferably cut out at $f$, so as not to contact with the wire on the spool or limit its capacity, as would be the case with the construction in Fig. 5, also by weighting the dog a more sensitive device is obtained and the dog is not in the way in stringing the ratchet upon a wire by reason of its cut-out portion.

It is obvious that my device may be used as well for tightening telephone or other wires as well as the line-wires of a fence, and I wish it understood that these various other uses have been considered in the construction of this device.

Having thus fully described my invention, what I claim is—

1. In a wire-tightener, the combination with a yoke formed with apertures at the ends forming bearings for the winding-spool, and a winding-spool integrally formed with trunnions adapted to engage the bearing-apertures of the yoke, one of said trunnions projecting beyond its bearing and adapted to receive a tool for rotating the spool, oppositely-disposed ratchet-teeth formed on the flanges of the spool on opposite sides and oppositely-inclined slots formed in the frame on opposite sides and a locking-bar guided in said slots and coöperating with the ratchet-teeth to lock the spool in either position of the parts.

2. In a wire-tightener, the combination with a yoke or frame having apertured ends and provided in its closed end with an aperture, a spool having a transverse aperture, trunnions formed integral with the ends of said spool and journaled in the apertures in the ends of said frame, one of said trunnions extending beyond the side of the yoke and adapted to receive a tool for rotating the spool, oppositely-disposed ratchet-teeth formed in the flanges of said spool and oppositely-inclined slots formed in the sides of the frame adjacent to said teeth and a transverse gravity-bar guided in said slots and coöperating with said teeth to lock the spool from unwinding.

3. In a wire-tightener, the combination with a yoke formed with apertured ends forming bearings, a winding-spool formed with trunnions journaled in said bearings, one of said trunnions projecting beyond its bearing to form a wrench-hold, oppositely-disposed ratchet-teeth formed on the flanges of the spool, oppositely-inclined slots formed in the sides of the frame adjacent to the spool and a weighted gravity-dog guided at its opposite ends in said slots free to turn and coöperating with the ratchet-teeth to lock the spool.

4. In a wire-tightener, the combination of a yoke formed with apertured ends forming bearings and provided in its closed end with an aperture, a winding-spool having a transverse aperture in alinement with said aperture and trunnions formed integral with said spool journaled in the bearing-apertures in the ends of the frame, one of said trunnions projecting beyond its bearing to form a wrench-hold, oppositely-disposed ratchet-teeth formed on the flanges of the spool, and oppositely-inclined slots formed in the sides of the frame adjacent to said teeth and a weighted gravity-dog having a cut-out central portion and guided at its opposite ends in said slots free to turn and coöperating with the ratchet-teeth of the spool one end at a time.

5. In a wire-tightener, the combination with a yoke formed with apertured ends forming bearings, a winding-spool formed with flanges at its opposite ends and trunnions journaled in said bearings, oppositely-disposed ratchet-teeth on said flanges, oppositely-inclined slots in the sides of the yoke and a gravity-dog guided in said slots and coöperating with said teeth.

6. The combination of a yoke bent up from a piece of sheet metal and having an inwardly-bent base, wire-passages in the sides of the yoke in proximity to the base and bearings formed in the open ends of the yoke, a winding-spool formed with oppositely-disposed ratchet-teeth and trunnions at its opposite ends journaled in the bearings of the yoke, oppositely-inclined slots in the sides of the yoke and a gravity-dog guided at its opposite ends in said slots and coöperating with said ratchet-teeth.

7. The combination of the yoke integrally made in one piece of bent sheet metal having an upwardly-bent base and formed with bearings in the open ends, a wire-passage in the base of the yoke, a second wire-passage in the side of the yoke at or near the base, a winding-spool formed with trunnions journaled in the bearings of the yoke, one of said trunnions projecting beyond its bearings to form a wrench-hold, a wire-passage in the axis of the spool, oppositely-disposed ratchet-teeth on the end flanges of the spool, oppositely-inclined slots in the sides of the yoke adjacent to the spool and a transverse gravity-dog guided in said slots and adapted to engage said ratchet-teeth.

In testimony whereof I affix my signature in presence of two witnesses.

CHARLES A. WILLMARTH.

Witnesses:
WM. H. CARSON,
OTTO F. BARTHEL.